United States Patent Office 2,981,599
Patented Apr. 25, 1961

2,981,599

PROCESS FOR THE PRODUCTION OF LIGHT VOLUMINOUS SILICATES

Robert Schrauf, Frankfurt am Main, and Artur Frey, Frankfurt am Main-Rodelheim, Germany, assignors to Deutsche Gold- und Silber-Scheideanstalt vormals Roessler, Frankfurt am Main, Germany No Drawing. Filed July 5, 1957, Ser. No. 669,971

7 Claims. (Cl. 23—110)

The present invention relates to a process for the production of light voluminous silicates from natural materials which are especially suited as filters and, for example, present an active reenforcing filler for rubber.

It is known that natural silica products, such as kieselguhr, can be used for many purposes in technology, for instance, as insulating material or as carriers for catalysts. Such natural silicates, are, however, usually not usable as fillers when fineness of particle size is required and special active properties are required. For such purposes finely divided silica is usually prepared by reaction of soluble silicates with acids or salt solutions whereby when special measures, usually complicated, are employed during the reaction or working up of the silica produced a product of large surface area with more or less activity is obtained. This activity renders such prepared silicas suitable as fillers for rubber or rubber-like substances or also as carriers for catalysts when the carrier itself is also to exhibit catalytic properties.

It has also been proposed to convert natural products either completely or essentially composed of silica, such as sand, kieselguhr, or clay-like substances, into silicates by treatment with alkaline earth metal hydroxides in the presence of water at elevated temperatures and pressures. A rather strong loosening of the starting material is achieved in this manner and the silicates produced have a greater activity as a filler than the starting materials. However, when they are used as fillers in rubber some of their properties leave much to be desired so that they cannot be used with success in every instance.

According to the invention it was found unexpectedly that finely divided silicate products, which are especially well suited as active fillers for rubber and rubber-like materials and also suited as fillers for other materials or as carriers for catalysts, can easily be obtained from alkali metal-aluminum double silicates by treatment thereof in an aqueous dispersion in the presence of an alkaline earth metal hydroxide, preferably calcium hydroxide, at elevated temperatures and pressures.

The following alkali metal-aluminum double silicates are illustrative of the starting materials usable according to the invention: sodium- or potassium feldspars, mica minerals, leucite, and lithium- or cesium-containing minerals, such as lepidolite, petalite, pollucite and spodumene.

The starting materials can be subjected to the hydrothermal pressure treatment either directly or in preground or levigated state. In general it is preferred to wet-grind the starting double silicate with the hydroxide, preferably slaked lime, used in the hydrothermal reaction and then to disperse the ground product in water to produce a suspension containing 5 to 10 parts of water per part of solids contained therein. In order to ensure the flowability of the material treated it is preferable to work with suspensions containing at least 8 parts of water per part of solids.

The quantity of alkaline earth metal hydroxide employed is of significance. The quantity employed is calculated with reference to the $SiO_2$ content of the starting double silicate. The quantity of alkaline earth metal hydroxide employed should not be less than 0.5 mol and preferably be at least 0.75 mol per mol of $SiO_2$. Especially good results are achieved as will appear from the examples given below, particularly with a view to the suitability of the product as an active filler for rubber, when a quantity of alkaline earth metal hydroxide, preferably calcium oxide, is employed which is in excess of the stoichiometric quantity calculated upon the $SiO_2$ content of the starting double silicate. Consequently, according to a preferred embodiment of the invention the hydrothermal treatment of the starting double silicate is carried out in aqueous dispersion with 1.1 to 1.3 mol, preferably 1.15 to 1.25 mols, of alkaline earth metal hydroxide per mol of $SiO_2$ in the starting silicate.

The hydrothermal treatment of the aqueous dispersions is carried out under pressure at temperatures between 150 and 280° C., preferably between 180 and 210° C., whereby a pressure of about 18 to 19 atmospheres gauge pressure is attained. The products obtained with the process according to the invention are voluminous, light silicates whose poured and shaken weights are about ⅓ to ⅕ of those of the starting materials.

The hydrothermal treatment can be effectively carried out in autoclaves with strong stirring or in heatable pressure resistant tubes. By connecting several autoclaves or tubes in series, the process can be carried out continuously, the number of autoclaves and tubes being determined from the time required for the treatment and the rate of flow of the material being treated. In batch processes, treating periods of 2 to 4 hours are generally sufficient to effect the conversion of the starting materials.

The voluminous products obtained according to the invention have a pure white color and can be used for many purposes. They have proved especially suited as fillers for natural or synthetic rubber or other elastomers in which a reenforcing action is desired. Naturally they can also be used in other technical applications where inert fillers are used, for example, for weighting paper, or also as carriers for catalysts.

The following examples will serve to illustrate several embodiments of the invention and the reenforcing activity of the products obtained in rubber.

*Example 1*

A Habera-feldspar of the following composition:

| | Percent |
|---|---|
| $SiO_2$ | 68.00 |
| $Al_2O_3$ | 18.80 |
| $Fe_2O_3$ | 0.15 |
| CaO | 0.15 |
| $K_2O$ | 10.80 |
| $Na_2O$ | 1.03 |
| MgO | 0.02 |
| $H_2O$ | 1.05 | was treated with calcium hydroxide according to the process of the invention. For this purpose 600 g. of the feldspar were ground with 542 g. of slaked lime (corresponding to 381 g. CaO) and 2 liters of water in a ball mill for 24 hours. Thereafter, the ground product was suspended in 8 liters of water in an autoclave and treated therein with stirring for 2.5 hours at 200° C. After cooling down the reaction mixture the solid reaction product was filtered off and dried. The resulting voluminous white powder was then tested for its activity as a reenforcing filler in natural rubber. The quantity employed was 80 parts of the silicate filler per 100 parts rubber.

The vulcanizates produced had the following technical properties:

| Vulcanization time, minutes | 5 | 8 | 10 | 15 | 20 |
|---|---|---|---|---|---|
| Tensile strength, kg./cm.² | 194 | 185 | 189 | 180 | 181 |
| Mod., 300 kg./cm.² | 90 | 98 | 99 | 92 | 84 |
| Elongation on break, percent | 524 | 490 | 496 | 501 | 518 |
| Elasticity, percent | 49 | 51 | 51 | 49 | 46 |
| Shore hardness | 63 | 66 | 65 | 65 | 65 |
| Impact resistance, kg./cm | 20.5 | 18.9 | 19.5 | 18.3 | 18.5 |
| Abrasion loss, mm.³ | 175 | 192 | | | |
| Specific weight | 1.290 | | | | |

*Example 2*

A sodium-feldspar of the following composition was treated in the same manner as in Example 1:

| | Percent |
|---|---|
| $SiO_2$ | 70.32 |
| $Al_2O_3$ | 17.94 |
| $Fe_2O_3$ | 0.22 |
| $K_2O$ | 1.52 |
| $Na_2O$ | 7.89 |

The molar ratio of $SiO_2$ to calcium hydroxide again was maintained at 1:1.

The resulting voluminous white powder was also tested as in Example 1 as a filler for rubber and the vulcanizates obtained had the following technical properties:

| Vulcanization time, minutes | 5 | 8 | 10 | 15 | 20 |
|---|---|---|---|---|---|
| Tensile strength, kg./cm.² | 248 | 218 | 198 | 188 | 181 |
| Mod., 300 kg./cm.² | 111 | 93 | 77 | 59 | 60 |
| Elongation on break, percent | 526 | 537 | 548 | 599 | 603 |
| Elasticity, percent | 52 | 48 | 49 | 45 | 41 |
| Shore hardness | 74 | 73 | 67 | 65 | 75 |
| Impact resistance, kg./cm | 8.3 | 9.2 | 7.7 | 10.1 | 10.4 |
| Abrasion loss, mm.³ | 252 | 244 | | | |
| Specific weight | 1.281 | | | | |

*Example 3*

A leucite whose $SiO_2$ content was relatively low of the following composition:

| | Percent |
|---|---|
| $SiO_2$ | 55.20 |
| $Al_2O_3$ | 20.48 |
| $Fe_2O_3$ | 5.22 |
| $MnO$ | 0.10 |
| $CaO$ | 4.22 |
| $K_2O$ | 10.23 |
| $Na_2O$ | 3.50 | was given a hydrothermal treatment analogous to that described in Example 1 except that the molar ratio of $SiO_2$ in the leucite to the calcium hydroxide employed was 1:1.2.

The resulting voluminous powder was also tested as in Example 1 as a filler for rubber and the vulcanizates obtained had the following technical properties:

| Vulcanization time, minutes | 5 | 8 | 10 | 15 | 20 |
|---|---|---|---|---|---|
| Tensile strength, kg./cm.² | 189 | 178 | 162 | 158 | 149 |
| Mod., 300 kg./cm.² | 82 | 74 | 62 | 48 | 44 |
| Elongation on break, percent | 525 | 535 | 547 | 603 | 610 |
| Elasticity, percent | 50 | 46 | 45 | 43 | 44 |
| Shore hardness | 66 | 66 | 62 | 60 | 57 |
| Impact resistance, kg./cm | 16.6 | 15.2 | 14.2 | 10.4 | 9.6 |
| Abrasion loss, mm.³ | 260 | 258 | | | |
| Specific weight | 1.302 | | | | |

A comparison of the properties attained in Examples 2 and 3 clearly shows that the use of an excess of calcium hydroxide favorably influences the impact resistance of the vulcanizates obtained. This advantageous property which is attained with use of excess of lime is more clearly discernible in the following example.

*Example 4*

Two batches of petalite of the following composition:

| | Percent |
|---|---|
| $SiO_2$ | 75.3 |
| $Al_2O_3$ | 14.5 |
| $Li_2O$ | 3.9 |
| $Fe_2O_3$ | 0.3 |
| Other alkaline oxides | 0.6 | were given a hydrothermal treatment analogous to that described in Example 1, the molar ratio of $SiO_2$ to calcium hydroxide being 1:1 in the first batch and 1:1.25 in the second batch.

The resulting voluminous powders were then tested as in Example 1 as a filler for rubber and the vulcanizates obtained had the following properties:

Mol ratio $SiO_2:Ca(OH)_2=1:1$

| Vulcanization time, minutes | 5 | 8 | 10 | 15 | 20 |
|---|---|---|---|---|---|
| Tensile strength, kg./cm.² | 182 | 170 | 159 | 153 | 146 |
| Mod., 300 kg./cm.² | 75 | 61 | 53 | 45 | 42 |
| Elongation on break, percent | 537 | 563 | 583 | 615 | 630 |
| Elasticity, percent | 43 | 42 | 42 | 40 | 40 |
| Shore hardness | 68 | 65 | 63 | 61 | 60 |
| Impact resistance, kg./cm | 9.5 | 9.4 | 10.1 | 10.3 | 10.2 |
| Abrasion loss, mm.³ | 212 | 210 | | | |
| Specific weight | 1.298 | | | | |

Mol ratio $SiO_2:Ca(OH)_2=1:1.25$

| Vulcanization time, minutes | 5 | 8 | 10 | 15 | 20 |
|---|---|---|---|---|---|
| Tensile strength, kg./cm.² | 200 | 184 | 183 | 169 | 162 |
| Mod., 300 kg./cm.² | 92 | 97 | 97 | 75 | 64 |
| Elongation on break, percent | 520 | 488 | 490 | 528 | 560 |
| Elasticity, percent | 40 | 40 | 41 | 36 | 34 |
| Shore hardness | 66 | 70 | 69 | 69 | 65 |
| Impact resistance, kg./cm | 24.5 | 24.7 | 20.8 | 19.6 | 15.4 |
| Abrasion loss, mm.³ | 189 | 193 | | | |
| Specific weight | 1.316 | | | | |

This example indicates that the use of an excess of calcium hydroxide according to the preferred modification of the invention causes a considerable increase in the impact resistance of the vulcanizates produced so that an outstanding active reenforcing filler can be easily obtained from a cheap raw material. It must also be pointed out that when lithium or cesium minerals are employed as the starting materials the process according to the invention renders it possible to recover these valuable metals in good yields in the form of their pure compounds in addition to the production of a valuable filler.

The properties of the new fillers in the rubber mixtures according to Examples 1 to 4 have been ascertained from mixtures of the following composition:

| | Parts by weight |
|---|---|
| Smoked sheets | 100 |
| Filler according to invention | 80 |
| Stearic acid | 2 |
| Zinc oxide | 5 |
| Glycol | 4 |
| 2-mercapto benzimidazol (age resisting agent) | 1 |
| Accelerator | 2.5 |
| Sulfur | 3 |

Vulcanization temperature, 134° C.

We claim:

1. A process for the production of light voluminous powdered silicates suited as filling materials which comprises reacting a naturally occurring alkali metal-aluminum double silicate mineral with an alkaline earth metal hydroxide in the form of an aqueous suspension containing at least 5 parts by weight of water per part by weight of total solids at superatmospheric pressure and a temperature between 150° and 280° C. until a powdered silicate product is obtained, the poured and shaken weight of which is about ⅓ to ⅕ of those of the starting material, the quantity of alkaline earth metal hydroxide present in such suspension being at least 0.5 mol per mol of $SiO_2$ present in said double silicate.

2. The process of claim 1 in which said alkaline earth metal hydroxide is calcium hydroxide.

3. The process of claim 1 in which the quantity of alkaline earth metal hydroxide is at least 0.75 mol per mol of $SiO_2$ in said double silicate.

4. The process of claim 1 in which the quantity of alkaline earth metal hydroxide is 1.1 to 1.3 mol per mol of $SiO_2$ in said double silicate.

5. The process of claim 1 in which the quantity of alkaline earth metal hydroxide is 1.15 to 1.25 mol per mol of $SiO_2$ in said double silicate.

6. The process of claim 1 in which the ratio of total solids to water by weight is 1 to at least 8.

7. The process of claim 1 in which the treatment under pressure is carried out at temperatures between 180 and 210° C.

References Cited in the file of this patent
UNITED STATES PATENTS

| | | |
|---|---|---|
| 1,756,624 | Behrman | Apr. 29, 1930 |
| 2,742,345 | Kloepfer et al. | Apr. 17, 1956 |

OTHER REFERENCES

Mellor: "A Comprehensive Treatise on Inorganic and Theoretical Chemistry," pp. 691 and 698, vol. 6, Longmans, Green and Co., New York, 1925; page 573, last paragraph, 574, first paragraph.

Freidel et al.: "Comptes Rendus," 110–1170–1178 (1890).